(12) United States Patent
Khanzode et al.

(10) Patent No.: US 8,804,258 B1
(45) Date of Patent: Aug. 12, 2014

(54) METHOD AND APPARATUS FOR COMMUNICATING WITH A DISK CONTROLLER FOR TESTING

(71) Applicant: Marvell International Ltd., Hamilton (BM)

(72) Inventors: Vivek Khanzode, Sunnyvale, CA (US); Hongying Sheng, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/687,607

(22) Filed: Nov. 28, 2012

Related U.S. Application Data

(60) Provisional application No. 61/564,790, filed on Nov. 29, 2011.

(51) Int. Cl.
 *G11B 5/09* (2006.01)
(52) U.S. Cl.
 USPC .............. 360/39; 360/53; 360/55; 360/31
(58) Field of Classification Search
 None
 See application file for complete search history.

(56) References Cited

U.S. PATENT DOCUMENTS 7,613,525 B2 * 11/2009 Ogasawara et al. ......... 360/73.03
2009/0231744 A1 * 9/2009 Suzuki et al. .................. 360/31

* cited by examiner

*Primary Examiner* — Muhammad N Edun

(57) ABSTRACT

Embodiments of the present disclosure provide for reading data from a physical storage medium, transferring the data between a data channel and a test interface over a parallel data bus, and providing the data from the test interface at a serial port in a serial format.

20 Claims, 3 Drawing Sheets

METHOD AND APPARATUS FOR COMMUNICATING WITH A DISK CONTROLLER FOR TESTING

CROSS-REFERENCE TO RELATED APPLICATION

The present disclosure claims priority to U.S. Provisional Patent Application No. 61/564,790, filed on Nov. 29, 2011, which is incorporated herein by reference.

TECHNICAL FIELD

This disclosure relates to high-speed data transfer to and from a disk controller. More particularly, this disclosure relates to interfacing between a disk controller read channel and external testing equipment for testing the read channel and other components of the disk controller.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Controllers for disk drives often include a read/write component, which is typically referred to as a read channel (RDC). The RDC is responsible for reading data from the physical disk medium and for writing data to the disk medium, and acts as an interface to other components of the hard disk controller. The RDC and other components of the hard disk controller pass data among themselves over a parallel data bus, which is often referred to as a non-return-to-zero (NRZ) bus.

Disk drives and disk drive controllers are typically tested during or after manufacture to confirm proper operation. During such testing, an external tester can be connected to the parallel NRZ bus of the disk controller to provide data and commands and to receive data that is read from the disk medium. With the increasing data transfer speeds of hard disks, however, it has become difficult to maintain sufficient bus speeds between the disk controller and the external testing equipment.

SUMMARY

In one embodiment, the present disclosure describes a hard disk controller that comprises a data channel configured to read data from a physical storage medium, a parallel data bus, and a data interface configured to transfer the data between the data channel and a tester over a serial data link, wherein the data channel and the data interface are configured to communicate the data with each other over the parallel data bus. The data interface may comprise a converter between serial and parallel data.

The hard disk controller may further comprise memory configured to buffer data received from the tester, wherein the data interface is configured to generate an output signal to signal the tester regarding available buffer capacity.

The hard disk controller may further comprise a clock signal for synchronizing the tester with the data channel.

In another embodiment, the present disclosure provides a software program that is operable to cause a disk controller to perform actions comprising reading data from a physical storage medium, transferring the data between a data channel and a test interface over a parallel data bus within the disk controller, and providing the data from the test interface at a serial port in a serial format.

In yet another embodiment, the present disclosure provides a method comprising reading data from a physical storage medium, transferring the data between a data channel and a test interface over a parallel data bus, and providing the data from the test interface at a serial port in a serial format.

BRIEF DESCRIPTION OF THE DRAWINGS

Embodiments of the present disclosure will be readily understood by the following detailed description in conjunction with the accompanying drawings. To facilitate this description, like reference numerals designate like elements.

DETAILED DESCRIPTION

The following description merely provides examples and is in no way intended to limit the disclosure, its application, or uses.

Figure 1:
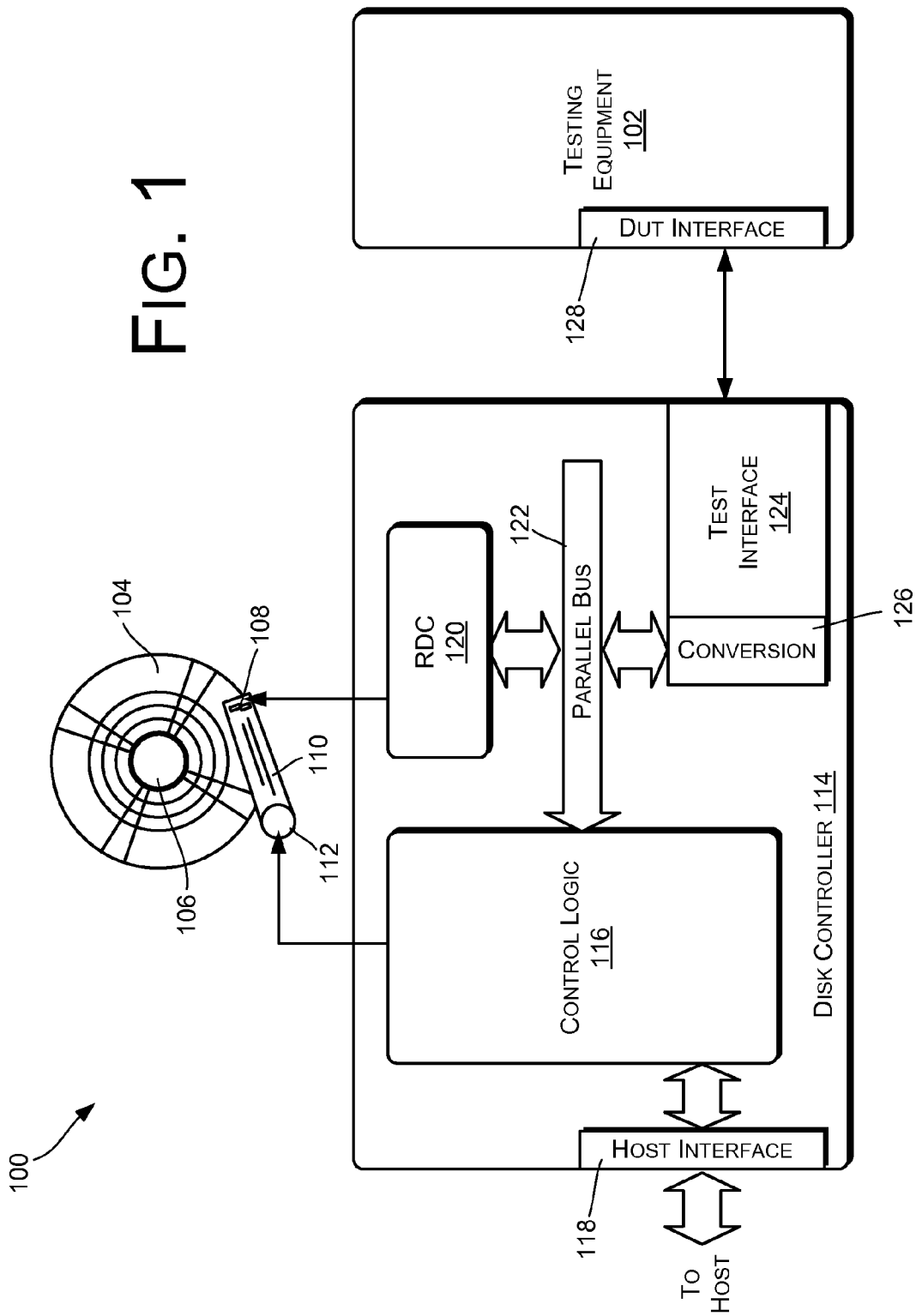
FIG. 1 is a representational view of a hard disk drive according to an example embodiment of the present disclosure.

FIG. 1 illustrates an example configuration of a hard disk drive 100 and external testing equipment 102. The hard disk drive 100 houses one or more physical storage media 104, which in this embodiment comprise one or more platters coated with a magnetic material and rotatable about a spindle/motor 106. A read/write head 108 is mounted to an arm 110 for movement of the read/write head 108 across the surface of the storage medium 104 under control of an actuator 112.

The hard disk drive 100 includes a disk controller 114, which may be implemented as an integrated circuit or chip, which may be referred to as a "system-on-a-chip." The disk controller 114 includes control logic 116, which may include a digital signal processor, a microprocessor, a microcontroller, or the like. The control logic 116 may also include other components and logical elements for electrical and mechanical control of the hard disk drive components.

The disk controller 114 has a host interface 118 configured to communicate data with a host (not shown), such as a computer or computer-based device. The host interface 118 may be an EIDE interface bus, an ATA or serial ATA (SATA) interface bus, a fibre channel (FC), or Serial Attached SCSI (SAS) interface, although other buses and interfaces may be used in various embodiments.

The disk controller 114 also includes a data channel 120, which is commonly referred to as a read channel (RDC). The RDC 120 performs read and write access to the surface of the physical medium 104 via the read/write head 108. The control logic 116 provides functionality in the form of a servo driver (not shown) for controlling the actuator 112 as data is being written or read through the read/write head 108.

Various components within the disk controller 114, including the RDC 120 and elements of the control logic 116, communicate with each other through a parallel bus 122, which may at times be referred to as a non-return-to-zero (NRZ) bus. The parallel bus 122 may have a width of 8-10 bits, as an example.

The disk controller 114 has a test interface 124 for connection to the testing equipment 102. The test interface 124 comprises a serial data communications port that is capable of both sending and receiving data. In the described embodiment, the transmit signals and the receive signals of the test interface 124 are each implemented as a differential signal pair. Data transferred through the test interface 124 is encoded using 8B/10B line coding techniques to provide DC-balanced transmit and receive signals.

The RDC 120 and the test interface 124 are configured to communicate data with each other over the parallel data bus 122. The test interface 124 has a parallel/serial conversion component 126 that translates data between the parallel format of the parallel bus 122 and the serial format that is used between the disk controller 114 and the testing equipment 102.

In an embodiment, both the host interface 118 and the test interface 124 may be implemented or supported using a design core, as will be described in more detail below.

The testing equipment 102, also referred to as the tester, is external to the disk controller 114 and may comprise any suitable equipment for sending and receiving data to and from the disk controller 114, and for performing logical testing and/or diagnostics of the disk controller 114 and/or the RDC 120 of the disk controller 114. The testing equipment 102 includes, or is associated with, a device-under-test (DUT) interface 128 for connection to the test interface 124 of the disk controller 114. The DUT interface 128 is configured to use the same serial data transfer protocol as the test interface 124, and therefore implements differential transmit and receive signal lines.

Figure 2:
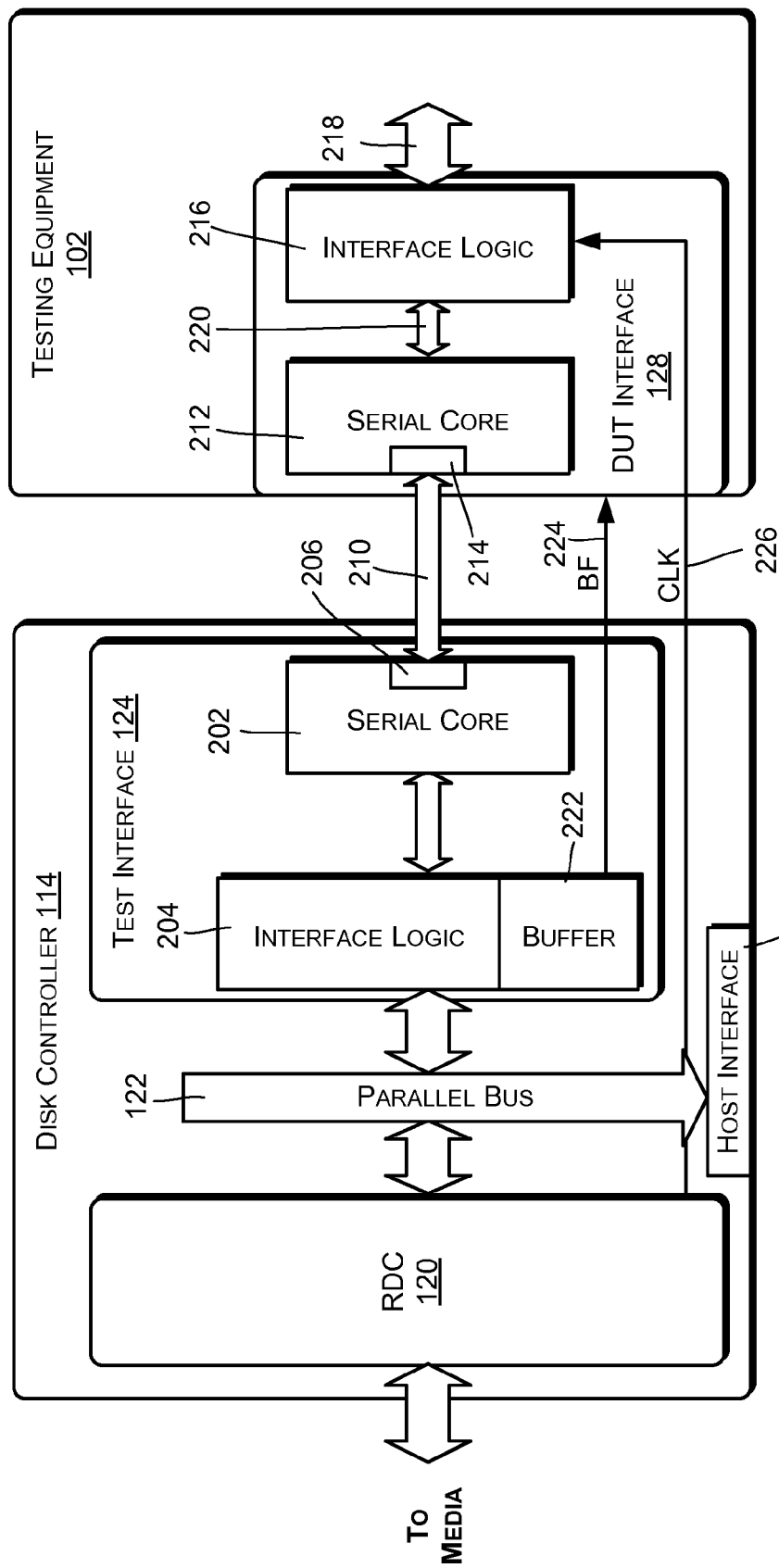
FIG. 2 is a block diagram showing details of a disk controller and its connections to testing equipment in an example embodiment of the present disclosure.

FIG. 2 illustrates further details regarding an example implementation of the disk controller 114 and the testing equipment 102. FIG. 2 shows only those components and functional elements that are relevant to this discussion. It should be understood that both the disk controller 114 and the testing equipment 102 include additional components and functionality that are not shown.

As described above, the disk controller includes a data channel or RDC 120 for transferring data to and from the physical media of a hard disk. The RDC 120 interfaces with the physical media 104, such as a rotating storage disk or other media. The RDC 120 communicates with other components of the disk controller 114 over the previously described parallel data bus 122.

The test interface 124 of the disk controller 114 is implemented with a serial design core 202, which in some embodiments may comprise a physical (PHY) layer internet protocol (IP) core. A design core or IP core is a preexisting or "off-the-shelf" design element that may be purchased, licensed, and/or used in an integrated circuit design to perform a desired function, without requiring a new design effort. In this case, the design core 202 implements a physical layer serial port.

Hard disk controllers typically include a physical (PHY) layer design core or IP core for communicating with host devices. Such a physical layer core is often referred to as a PHY core, and is used within the disk controller for implementation of the host interface 118. In the disk controller 114, this existing PHY core is also used to implement the serial interface 202.

The test interface 124 includes interface logic 204 that interfaces the serial core 202 to the parallel bus 122. The interface logic 204 is configured to translate and transfer data between the parallel bus 122 and the serial core 202, in accordance with the logical and electrical characteristics of the parallel bus 122 and the serial core 202.

The serial core 202 implements an external serial port 206 for communications with the testing equipment 102. Communications between the disk controller 114 and the testing equipment 102 are performed over a serial link 210, which may comprise a serial transmit signal and a serial receive signal.

The serial core 202 accepts parallel data from and provides parallel data to the parallel bus 122 through the interface logic 204. For communications with the testing equipment 102, however, the serial core 202 converts between the parallel format of the parallel bus 122 and the serial format of the serial link 210.

The DUT interface 128 of the testing equipment 102 uses a serial design core 212, which implements a serial port 214 that interfaces with the serial link 210. The serial core 212 performs serial to parallel conversion and parallel to serial conversion. More specifically, the serial core 212 interfaces between the serial format of the serial link 210 and a parallel format used within the testing equipment 102.

The serial core 212 may comprise a PHY IP core that is similar or identical to the PHY IP core 202 of the test interface 124.

The DUT interface 128 also has interface logic 216 that interfaces between the serial core 212 and the other components or functionality of the testing equipment 102. The interface logic 216 is configured to communicate with the testing equipment 102 using a parallel bus 218. The parallel bus 218 may be the same bit width as the parallel bus 122 of the disk controller 114, or may use a different bit width. In an embodiment, the serial core 212 communicates with the interface logic 216 over a parallel communications channel 220, which may be eight or ten bits in width. The interface logic 216 converts this to produce the parallel channel or bus 218, which may have a smaller width. In an embodiment, the clock rate or data transfer rate of the parallel channel or bus 218 may be based on the clock rate or data transfer rate used by the serial link 210. For example, the clock rate of the parallel channel or bus 218 may be equal to the clock rate of the serial link 210 divided by a factor of four. In this case, the parallel channel or bus 218 may have a width of four bits.

Note that the DUT interface 128 may be implemented as part of the testing equipment 102, as shown, or may be implemented as a front-end to preexisting testing equipment. In some implementations, the testing equipment 102 may comprise existing or legacy testing equipment that has been designed and configured to communicate with the disk controller using a parallel format, such as by communicating through the parallel bus 122 of the disk controller. For example, the testing equipment 102 may have an existing interface for connection to the parallel bus 122 of the disk controller 114. In this case, the serial core 212 and the interface logic 216 act to convert and transfer data between the serial link 210 and the existing parallel bus 218 of the testing equipment 102.

In certain embodiments, the DUT interface 128 may be implemented as a discrete integrated circuit such as by an application-specific integrated circuit (ASIC). Alternatively, the testing equipment 102 may be implemented as a field-programmable gate array (FPGA), and the DUT interface may be integrated as part of the FPGA.

The testing interface 102 may include a data buffer 222 that is used for buffering data that is received over the serial core 202 from the testing equipment 102. In certain implementations, a signal 224, referred to as a buffer_full (BF) signal, may be provided from the test interface 124 to the DUT interface 128 to indicate available capacity of the buffer 222, such when the buffer 222 is full or nearly full. The test interface 124 activates the BF signal 224 in order to request that the DUT interface 128 stop sending data. When the DUT interface 128 receives the BF signal 224, the DUT interface 128 is expected to stop sending data within a specified number of clock cycles.

The disk controller 114 may also be configured to provide a clock signal (CLK) 226 to the testing equipment, so that data transfers may be coordinated or synchronized between the disk controller 114 and the testing equipment 102. In certain embodiments, the RDC 120 may produce data at a variable data rate, while the serial link 210 operates at a fixed data rate. The CLK signal 226 allows synchronization between the RDC 120 and the testing equipment 102 in this situation.

The clock signal 226 may be based on or generated from the clock of the RDC 120. In an embodiment, the clock signal 226 is generated by dividing the clock of the RDC 120 by four.

8B/10B encoding may be used for data transferred over the serial link 210. 8B/10B is an encoding method that maps 8-bit data symbols to 10-bit data symbols to achieve a DC balanced signal. Data symbols are referred to as Dx.y symbols. Control symbols are referred to as Kx.y symbols.

In an embodiment, 8B/10B encoding and decoding may be performed by the interface logic 204 of the test interface 124 and by the interface logic 216 of the DUT interface 128. Data symbols transferred over the serial link 210 are encoded using Dx.y symbols that satisfy the constraints of the 8B/10B code. Kx.y symbols in the 10B space that satisfy the constraints of the code but do not have corresponding symbols in the 8B space are used for communicating commands and directives over the serial link 210. These command symbols are referred to as header commands. In an embodiment, special header commands are used to achieve the following types of data transfer between the two sides of the serial link 210:

Data transfer from the RDC in read mode.
Data transfer to the RDC in write mode.
Data transfer from the RDC in servo mode.
Data transfer from the RDC for analog-to-digital conversion (ADC) samples.
Fragment information (symbol count) transfer to the RDC from the testing equipment.
Data transfer from the RDC for spiral servo mode.

In certain embodiments, the DUT interface may be configured to implement pass/fail test functionality, such as by comparing data from the RDC to one or more predefined, selectable patterns. This feature may be provided for both read and servo transfer modes.

In addition, the DUT interface may in some situations be configured to expose RDC signals via one or more additional ports, which are designed to multiplex the signals into or out from the RDC.

Figure 3:
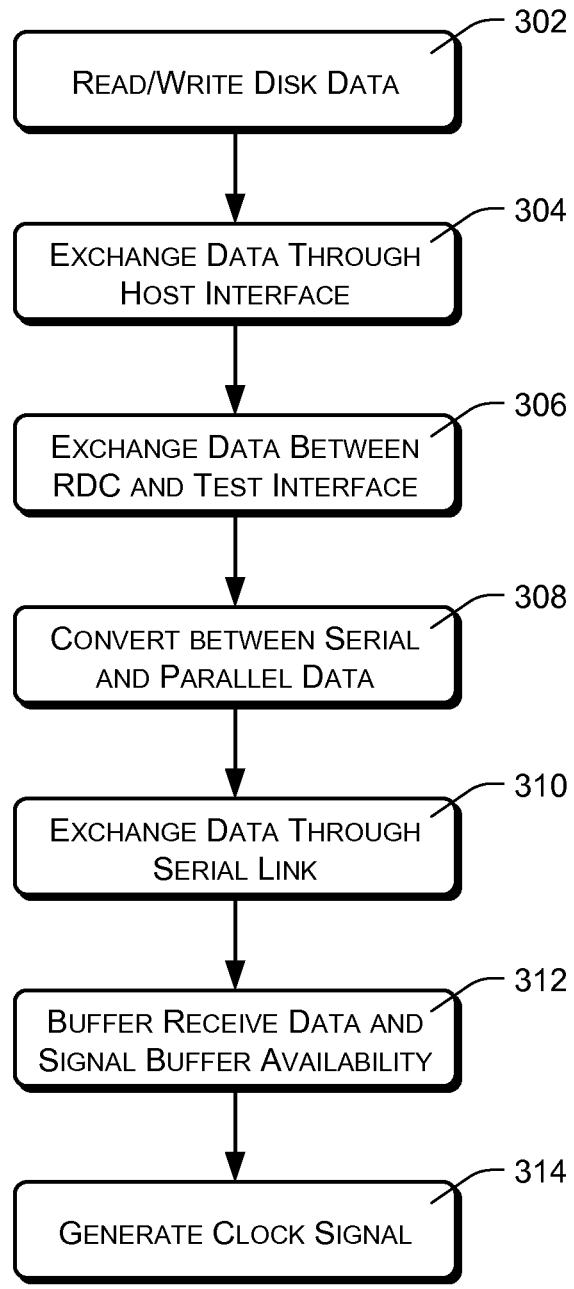
FIG. 3 is a flowchart illustrating a method of communicating between a disk controller and external testing equipment for testing the read channel of the disk controller.

FIG. 3 illustrates an example process that may be performed by the disk controller 114 in accordance with the techniques described above. An action 302 comprises reading and/or writing data from and/or to the physical storage medium 104. This action may be performed by the RDC 120 of the disk controller 114, and may comprise reading data from or writing data to a rotating disk such as a magnetic or optical storage medium.

At 304, data is transferred or exchanged with a host, through the host interface 118. The host interface 118 may be implemented or supported by a PHY IP core as described above.

At 306, the data is transferred or exchanged between the data channel 120 of the disk controller 114 and the test interface 124 over the parallel bus 122 of the disk controller 114.

The test interface 124 may be implemented or supported by the same PHY IP core that is used to implement or support the host interface 118.

At 308, serial/parallel conversion is performed between the parallel format of the bus 122 and the serial format of the serial link 210. This action may be performed by the PHY IP core 202 of the test interface 124.

At 310, that data is transferred or exchanged with the tester or testing equipment 102 in a serial format, over the serial communications link 210. This action is supported by the serial core 202 of the test interface 124.

At 312, data received from the external test equipment is buffered, and the external test equipment is signaled with a buffer_full signal 224 at the test interface regarding available buffer capacity.

At 314, the clock signal 226 is generated to synchronize the external testing equipment 102 with the RDC 120.

The described buffering techniques may be used for providing higher data transfer speeds between a disk controller and various testing equipment, by embedding the test interface on manufactured disk controllers. In addition, the serial link described above may in certain embodiments reduce power requirements of disk controllers.

Note that the description above incorporates use of the phrases "in an embodiment," or "in various embodiments," or the like, which may each refer to one or more of the same or different embodiments. Furthermore, the terms "comprising," "including," "having," and the like, as used with respect to embodiments of the present disclosure, are synonymous.

As used herein, the terms "logic," "component," and "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. The logic and functionality described herein may be implemented by any such components.

In accordance with various embodiments, an article of manufacture may be provided that includes a storage medium having instructions stored thereon that, if executed, result in the operations described above. In an embodiment, the storage medium comprises some type of non-transitory memory (not shown). In accordance with various embodiments, the article of manufacture may be a computer-readable medium such as, for example, software or firmware.

Various operations may have been described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Although certain embodiments have been illustrated and described herein, a wide variety of alternate and/or equivalent embodiments or implementations calculated to achieve the same purposes may be substituted for the embodiments illustrated and described without departing from the scope of the present disclosure. This application is intended to cover any adaptations or variations of the embodiments discussed herein. Therefore, it is manifestly intended that embodiments in accordance with the present disclosure be limited only by the claims and the equivalents thereof.

What is claimed is:

1. A hard disk controller comprising:
   a data channel configured to read data from a physical storage medium;
   a parallel data bus;
   a test interface configured to (i) communicate with the data channel over the parallel data bus, and (ii) communicate with a testing equipment over a serial data link, wherein data read from the physical storage medium is transferred from the data channel to the testing equipment via (i) the parallel data bus, (ii) the test interface, and (iii) the serial data link, wherein each of the testing equipment and the serial data link is external to the hard disk controller; and
   a host interface configured to (i) communicate with the data channel over the parallel data bus, and (ii) communicate with a host device that is external to the hard disk controller, wherein the host interface is different from the test interface.

2. The hard disk controller of claim 1, wherein the test interface comprises a physical layer.

3. The hard disk controller of claim 1, wherein the test interface comprises a physical Internet Protocol (IP) core.

4. The hard disk controller of claim 1, further comprising a physical Internet Protocol (IP) core configured to transfer data between the hard disk controller and the host device, wherein the physical IP core is further configured for use by the test interface to transfer the data between the parallel data bus and the testing equipment.

5. The hard disk controller of claim 1, wherein the test interface comprises a converter between serial and parallel data.

6. The hard disk controller of claim 1, wherein the serial data link comprises a differential transmit signal and a differential receive signal.

7. The hard disk controller of claim 1, wherein the physical storage medium comprises a rotating disk.

8. The hard disk controller of claim 1, further comprising memory configured to buffer data received from the testing equipment, wherein the test interface is configured to generate an output signal to signal the testing equipment regarding available buffer capacity.

9. The hard disk controller of claim 1, further comprising a clock signal for synchronizing the testing equipment with the data channel.

10. The hard disk controller of claim 1, wherein the data channel comprises a read channel (RDC).

11. A software program embodied upon a non-transitory computer readable medium and operable to cause a disk controller to perform actions, wherein the actions comprise:
    reading data from a physical storage medium;
    transferring the data read from the physical storage medium between a data channel and a test interface over a parallel data bus within the disk controller;
    providing the data from the test interface to a testing equipment via a serial port in a serial format;
    communicating, by a host interface, with the data channel via the parallel data bus; and
    communicating, by the host interface, with a host device.

12. The software program of claim 11, the actions further comprising supporting both the test interface and the host interface with a physical Internet Protocol (IP) core of the disk controller.

13. The software program of claim 11, wherein the reading comprises reading the data from a rotating disk.

14. The software program of claim 11, the actions further comprising buffering received data from the testing equipment a and signaling the testing equipment at the test interface regarding available buffer capacity.

15. The software program of claim 11, the actions further comprising generating a clock signal to synchronize the testing equipment with the data channel.

16. A method comprising:
    reading data from a physical storage medium;
    transferring the data read from the physical storage medium between a data channel and a test interface over a parallel data bus;
    providing the data from the test interface to a testing equipment via a serial port in a serial format;
    communicating, by a host interface, with the data channel via the parallel data bus; and
    communicating, by the host interface, with a host device.

17. The method of claim 16, further comprising supporting both the test interface and the host interface with a physical Internet Protocol (IP) core.

18. The method of claim 16, wherein the reading comprises reading the data from a rotating disk.

19. The method of claim 16, further comprising buffering received data from the testing equipment and signaling the testing equipment at the test interface regarding available buffer capacity.

20. The method of claim 16, further comprising generating a clock signal to synchronize the testing equipment with the data channel.

* * * * *